March 24, 1970  C. W. GILLARD  3,503,012
OPTICAL DIFFERENTIAL INTERFEROMETER DISCRIMINATOR
FOR FM TO AM CONVERSION
Filed Nov. 13, 1967  4 Sheets-Sheet 1

INVENTOR.
CALVIN W. GILLARD
BY
George C. Sullivan
Agent

INVENTOR.
CALVIN W. GILLARD

*INVENTOR.*
CALVIN W. GILLARD
BY
Agent

United States Patent Office 3,503,012
Patented Mar. 24, 1970

3,503,012
OPTICAL DIFFERENTIAL INTERFEROMETER DISCRIMINATOR FOR FM TO AM CONVERSION
Calvin W. Gillard, Palo Alto, Calif., assignor to Lockheed Aircraft Corporation, Burbank, Calif.
Filed Nov. 13, 1967, Ser. No. 681,984
Int. Cl. G02f 2/00; H01n 3/10
U.S. Cl. 332—1  11 Claims

ABSTRACT OF THE DISCLOSURE

An optical differential interferometer discriminator is provided for converting frequency modulated optical signals to amplitude modulated optical signals. An arrangement of optical mirrors is utilized in a modified version of a Michelson interferometer wherein a pair of reflectance mirrors are disposed along two paths of an optical beam splitter such that the distance (L) along both optical paths appear to be geometrically equal, whereas the physical and optical path may be unequal. An apparent geometrical equality results from the presence of a dielectric material disposed along the path of one or more of the mirrors which is farthest from the beam splitter. This actual space relationship between the mirrors results in the production of an amplitude modulated optical signal when the reflected optical signals of a frequency modulated beam time delayed by different amounts, is transmitted back through the beam splitter from the mirrors disposed at physically unequal distances therefrom.

PRIOR ART

In the prior art various known apparatus has been employed for the detection and measurement of the frequency of vibration of vibratory bodies which utilize light reflected from a source onto a photoelectric cell by means of a mirror, the mounting of which was brought into contact with the vibratory body so that the vibrations thereof were imparted to the mirror, the resulting oscillations of the beam of light falling upon the photocell causing electrical current variations to occur through the cell which were used as an indication of the vibrations of the body. Such prior art arrangements have proven unsatisfactory in that the mass of the body may be so large as to result in an amplitude of vibration so low as not to produce a detectable change of light flux at the surface of the photoelectric cell, making it difficult to obtain an adequate and accurate indication.

In another area of the prior art, in the technology of radio communication, it has been established that the imposition of a message wave on a carrier by modulating the frequency of the carrier, in contrast to its amplitude, permits a marked improvement in the ratio of the received signal to the noise, and consequently, a marked reduction in the degradation of the message by noise. This improvement is especially realized with "wide swing" frequency modulation. When the technique of frequency modulation is employed the message can be recovered from the modulated radio wave only by the use of a "slope" circuit or some equivalent device that converts variations of frequency or of phase of the carrier into variations of amplitude, and delivers the latter at its output terminals in a form suitable for application to a reproducer. Circuits and devices of this kind are generally known as discriminators.

At optical wave lengths, in which the frequencies of vibration are many times higher than radio frequencies, no completely satisfactory devices are available for converting frequency modulated light signals into amplitude modulated signals. Optical discriminator devices employing Kerr cells or birefringent materials have been utilized for frequency modulation-to-amplitude modulation conversion but with unsatisfactory results.

Of particular interest to the present invention is the birefringent discriminator which includes a polarizer, an optical phase bias, a birefringement element, of calcite for example, and an optical analyzer. The optical current output of a birefringent discriminator is defined by the following equation which is similar to that of the present invention:

$$I = I_0 \cos^2\left(\frac{2\pi \frac{\Delta n L}{c} \nu_0 + \phi}{2}\right) \quad (1)$$

where:

I = optical intensity output
$I_0$ = initial optical intensity
$\Delta n = ne - no$ = difference in refractive indices
L = length of birefringent crystal element
$\nu_0$ — Doppler frequency shift of optical beam
$\phi$ = optical phase bias term
c = speed of light In comparison, the equation which is applicable to the present invention is as follows:

$$I = I_0 \cos^2\left(\frac{2\pi 2\Delta l}{c} \nu_0 + \phi\right) \quad (2)$$

where:

$$\Delta l = \left(l - \frac{l}{n}\right) + n l_d - l$$

$l_d$ = length of dielectric material
n = refractive index
l = distance between the beam splitter and the apparent position of the mirror.

When $2\Delta l = \Delta n L$, the two devices are equal in their FM-AM response. That is, in the case of the birefringent discriminatior $\Delta n L$ is the path difference between two beams (i.e., horizontally and vertically polarized components in the birefringent crystal) before they are caused to interfere. For the differential interferometer this difference is $2\Delta l$. When these path differences are equal ($\Delta n L = 2\Delta l$) the two devices will possess equal FM-AM responses.

The prior art birefringent discriminators have been found to be unsatisfactory for the following reasons:

(a) The input aperture is small and requires a collimated light beam for operation;
(b) The device is direction sensitive in that the slightest deviation in the direction of the light beam from the axis of the device causes changes in the optical bias resulting in an erroneous reading;

(c) The optical bias device is complex, comprising a rotatable half-wave plate, the angular position of which controls the bias, and a fixed quarter wave plate disposed on either side thereof;

(d) the birefringent crystal element cannot presently be made synthetically, so that the device is limited in performance to the quality of the crystals found naturally. In addition, the crystal material is costly; and (e) the birefringent crystal element is temperature sensitive, so that it must be operated in a temperature controlled environment.

The present invention obviates the disadvantages of the prior art devices, particularly as to the birefringent discriminator, by providing an optical differential interferometer discriminator for converting frequency modulated optical signals to amplitude modulated optical signals. The present invention features several advantages: it is capable of using either divergent or convergent light sources; is insensitive to small angular variations in an input beam; may be readily adjusted to accommodate large frequency deviation, referred hereinafter to the "FM modulation index"; and is insensitive to ambient temperature changes.

Accordingly, a principal object of the present invention is the provision of an optical differential interferometer discriminator for converting frequency modulated optical signals to amplitude modulated optical signals.

Another object of the present invention is the provision of a laser velocimeter system for diagnosing the effects of large or small shock events in solid materials.

Still another object of the present invention is the provision of a velocimeter system which is insensitive to small angular variations in the input optical beam and will operate with either convergent or divergent input beams.

A further object of the present invention is the provision of an optical differential interferometer discriminator which has a frequency modulation index, which may be adjusted to accommodate any desired frequency deviation.

Another object of the present invention is the provision of an optical differential interferometer discriminator which eliminates the need for thermal control during operation.

Still another object of the present invention is the provision of a device which is capable of amplitude modulating an input signal or demodulating a frequency modulated input signal.

In accordance with the present invention, optical mirrors are utilized in an arrangement which may be considered a modified version of a Michelson interferometer. In one embodiment of the invention a reflectance mirror is disposed along each of the two paths of an optical beam splitter such that the distance (L) along both optical paths appear to be geometrically equal, whereas the physical and optical paths are unequal. To provide this apparent geometrical equality, a dielectric material is disposed along the path of one mirror which is farthest from the beam splitter. The presence of the dielectric material along the one path produces an apparent distance from the beam splitter equal to actual distance from the other mirror. The existence of this space relationship between the mirrors results in the production of an amplitude modulated interference pattern (outward signal) when a frequency modulated optical signal is transmitted through the device.

In another embodiment of the invention at least one dielectric element, an electro-optic material, is provided with a pair of conductive elements disposed along parallel surfaces of the element. A varying electric field across the body thereof to which a modulating (or direct current) signal is applied, results in an amplitude modulated output signal. The imposition of a varying electric field across the body of the dielectric element causes the refractive index thereof to vary, thereby causing a small variation in the apparent position of the mirror adjacent the dielectric element. The application of a direct current signal changes the refractive index which provides a means to vary the optical phase bias of the system.

In still another embodiment of the present invention one or more dielectric elements are disposed along each arm of the device. The use of one or more dielectric elements in this manner enhances the operation of the device in that the device becomes more insensitive to angular deviations in the incoming optical beam. Insensitivity of the device response to input beam angular variation, as well as input beam convergence or divergency, may be defined as lack of change in the output interference pattern due to the aforementioned variations.

An analysis of the device and its operation has demonstrated that in a semi-quantitative sense the changes in optical path difference ($\Delta L$), or change in the optical phase bias ($\Delta \phi$), where $\Delta \phi$ equals $2\pi/\lambda \Delta L$, can be expressed as a power series in $\sin \theta$. That is, $$\Delta L(\theta) = \alpha_0 + \alpha_1 \sin^2 \theta + \alpha_2 \sin^4 \theta + \quad (3)$$

Because of symmetry, only even terms in $\sin \theta$ exist in the series. Through the use of $n$ dielectric elements in each arm ($n \geq 1$) having selected refractive indices, it is possible to construct a device in which the coefficients, $a_1, a_2 \ldots a_{n-1}$ in Equation 3 are zero. Thus for a device with only one dielectric element, the coefficient $a_1$ is zero; and for the device with two dielectric elements, coefficients $a_1$ and $a_2$ are zero.

From the foregoing discussion it can readily be seen that as more and more dielectric elements are added to the system $\Delta L(\theta)$ approaches $a_0$, which represents a constant path difference since the $\sin m\theta$ for higher orders becomes very small after say, $m=6$. Thus, the sensitivity of the device to input beam angular variations is reduced; it produces an extremely stable output interference pattern with the inclusion of only 2 dielectric elements, one in each arm of the device.

The novel features which are believed to be characteristic of the invention, both as to its organization and method of construction and operation, together with further objects and advantages thereof, will be better understood from the following description, considered in connection with the accompanying drawings in which illustrative embodiments of the invention are disclosed by way of example. It is expressly understood, however, that the drawings are for the purpose of illustration and description only and do not define limitations of the invention.

Figure 5:
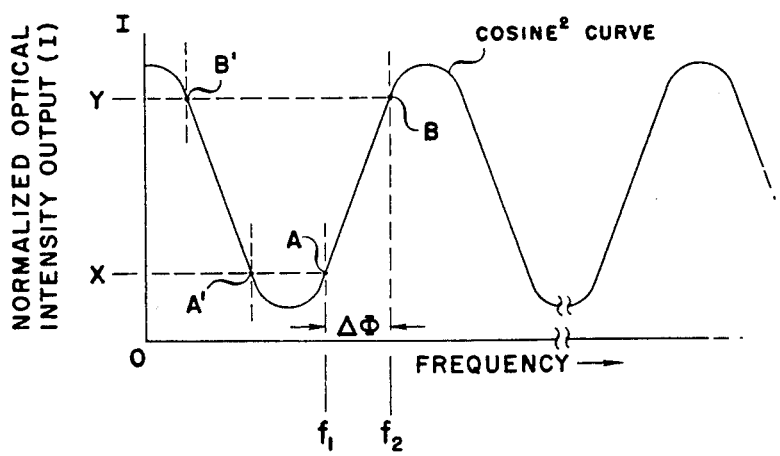
Figure 6:
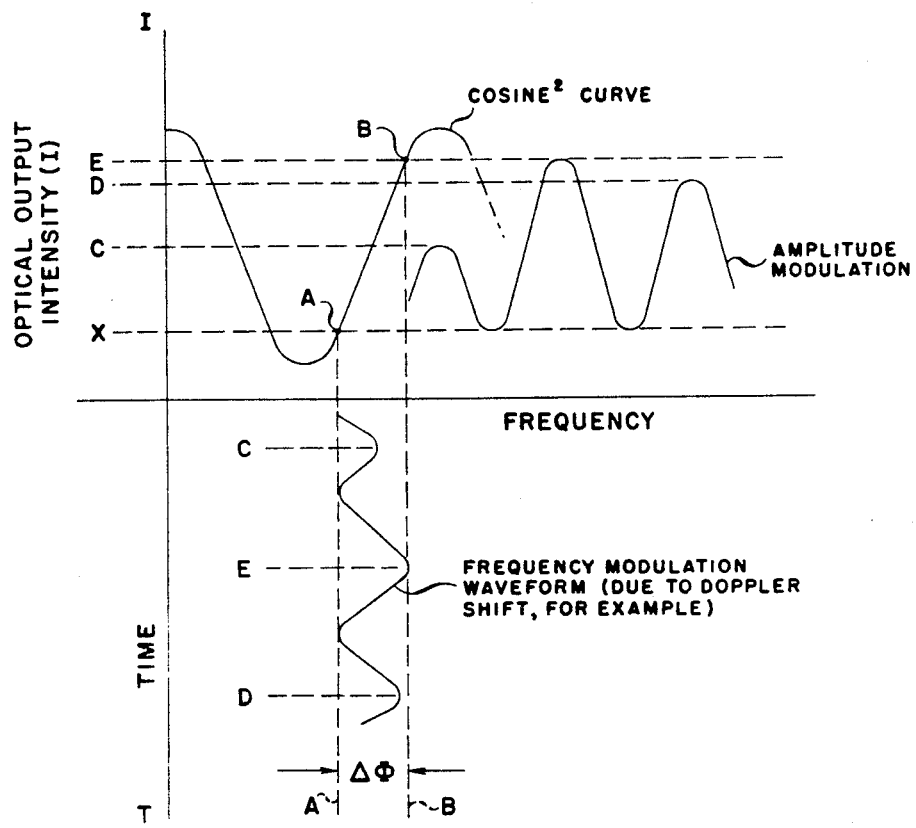

FIGURE 5 is a plot of normalized optical intensity output versus frequency for the response of the device illustrating the response is proportional to $\cos^2 (\Delta\phi/2)$; and FIGURE 6 is a plot of the response of the device of the present invention illustrating how a frequency modulated signal projected along the linear portion of the cosine$^2$ curve would produce an amplitude modulated signal.

Figure 1:
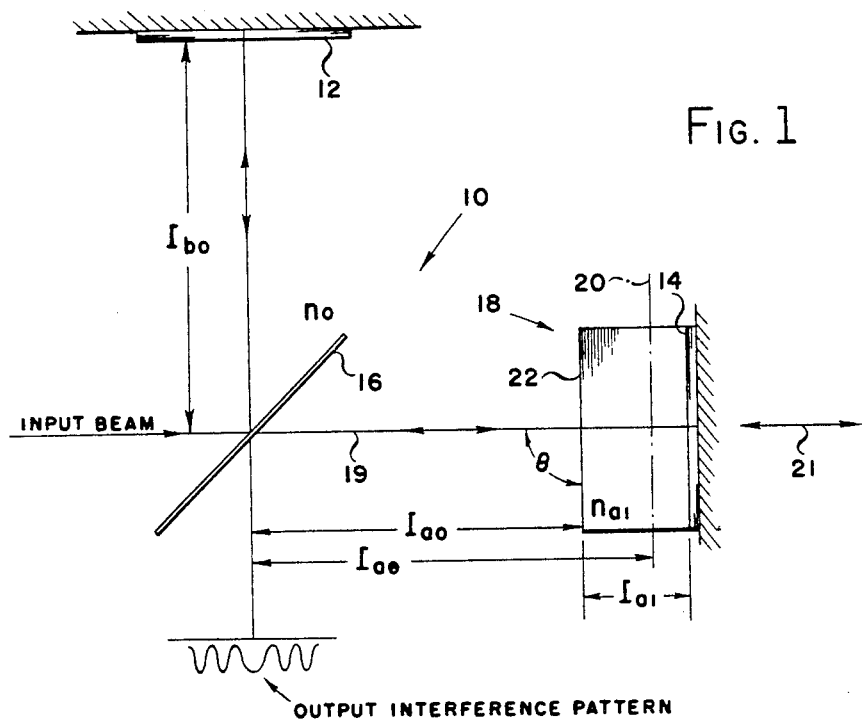
FIGURE 1 is a schematic view of one embodiment of the present invention.

With reference to FIGURE 1, there is shown the simplest form of a differential interferometer in accordance with the present invention. The interferometer arrangement 10 comprises two mirrors 12 and 14, a beamsplitter device 16 and a dielectric element 18 having a length designated ($la_1$) and a refractive index ($na_1$). From the geometrical optics of the arrangement it has been determined that mirror 14 has an apparent position designated by reference 20, at a depth of $la_1/na_1$, measured from the dielectric element surface 22, which may have an antireflection coating thereon.

As shown in FIGURE 1, $la\theta$, the distance from the beamsplitter 16 to apparent mirror position 20, is equal to $l_{b0}$, the distance from the beamsplitter 16 to mirror 12. In this arrangement both mirrors 12 and 14 appear geometrically equidistance from the beamsplitter. It is apparent that optically the path lengths are different. The optical path difference ($\Delta L$) for a normal incidence beam of light is given by the following equation:

$$\Delta L = 2la_1 \left( na_1 - \frac{1}{na_1} \right) \qquad (4)$$

It has been found that for small angular deviation of the input light beam from the normal to the dielectric element 18, (within ±3 degrees of interferometer axis 19), the device output diffraction pattern does not change appreciably. Also, a ray of light of small dimensions will track and interfere with itself after traversing both arms of the interferometer, which means that the device may be employed with convergent or divergent light.

Also shown in FIGURE 1, is a two headed arrow 21 which represents a device for mechanically moving the mirror 14 and dielectric element 18 along the interferometer axis 19. Movement of the mirror and dielectric element is provided to produce a change in the optical phase bias of arrangement 10. The significance of varying the optical bias will be discussed in greater detail herein below in connection with the operation of the differential interferoment arrangement.

Figure 2:
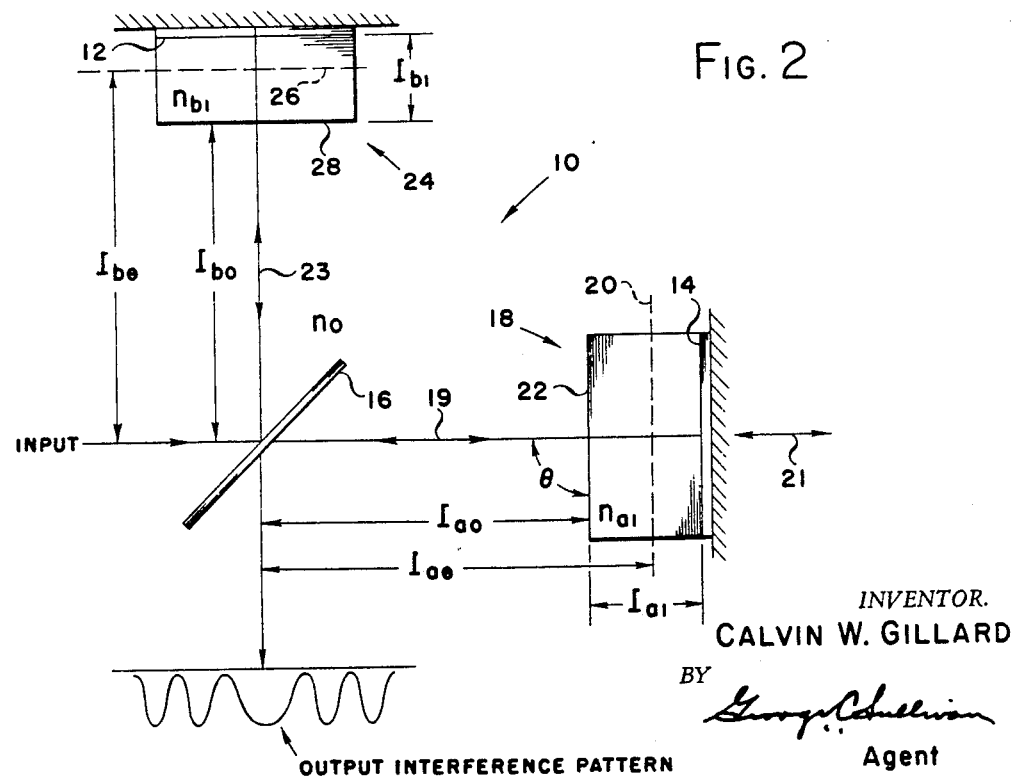
FIGURE 2 is a schematic view of another embodiment of the present invention.

With reference to FIGURE 2, there is shown a more complex arrangement of a differential interferometer discriminator device than that shown in FIGURE 1, in that a second dielectric element 24 is disposed along the other arm and axis 23 of the interferometer, adjacent to mirror 12. As shown in FIGURE 2, the length of dielectric element 24 is designated by ($l_{b1}$) and has a refractive index ($n_{b1}$). Mirror 12 has an apparent position designated by reference 26 at a depth of ($l_{b1}/n_{b1}$) measured from the dielectric element surface 28, which may be coated with an anti-reflection material. As shown in FIGURE 2, the distances from the beamsplitter 16 to the apparent mirror positions 20 and 26 are equal, that is $l_{a\theta}$ equals $l_{b\theta}$.

Figure 3:
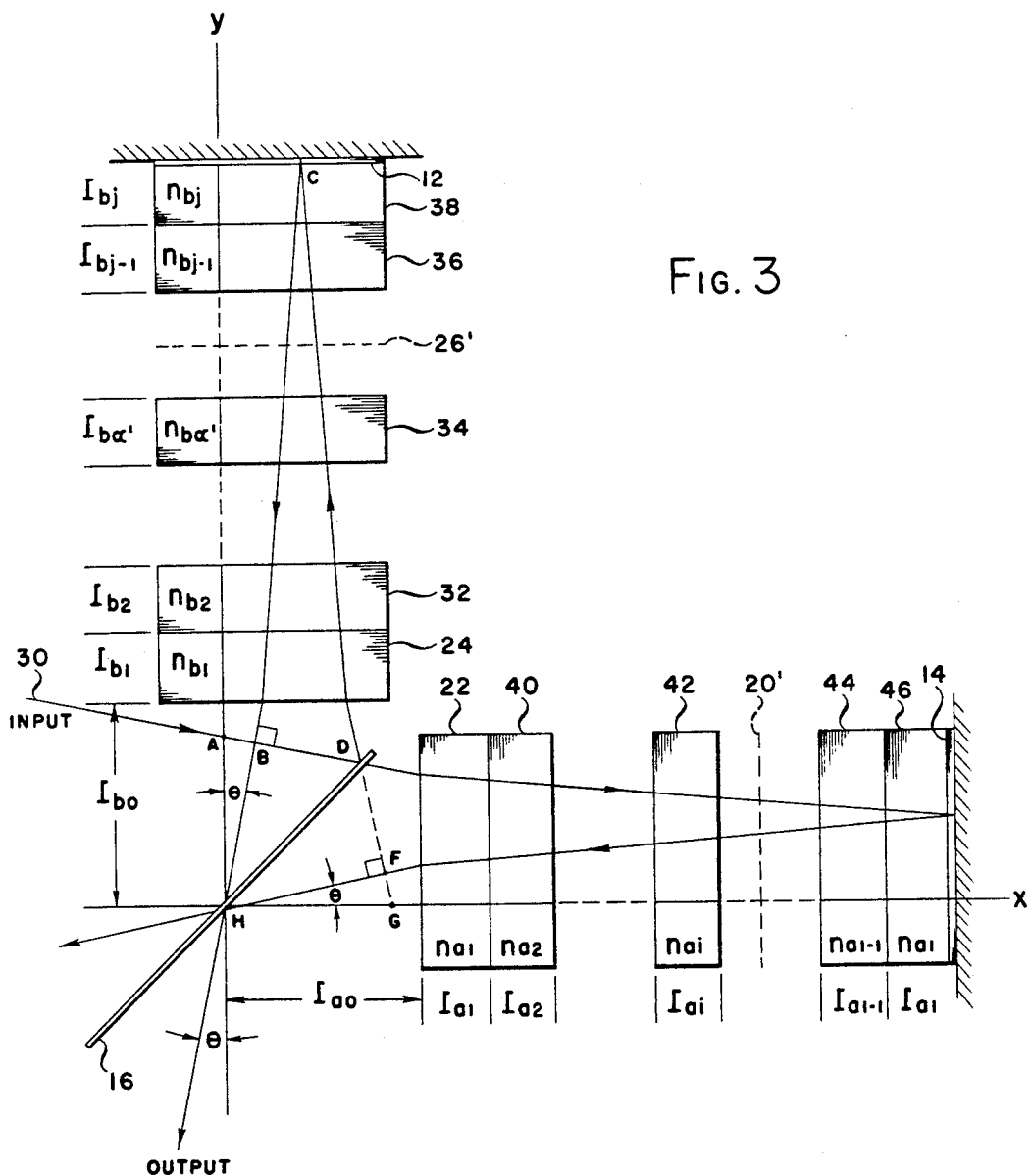
FIGURE 3 is a schematic view of a general differential interferometer of the present invention.

With reference to FIGURE 3, there is shown a more general arrangement for a differential interferometer device in accordance with the present invention, wherein more than one dielectric element is disposed along each arm of the device. In addition a more generalized input beam 30 (off-axis) is shown.

In FIGURE 3, a series of dielectric elements 24, 32, 34, 36 and 38 are disposed along the arm of the interferometer with mirror 12. The apparent position of mirror 12 is designated by reference 26. While the other arm of the interferometer contains dielectric elements, 22, 40, 42, 44 and 46, the apparent position of mirror 14 is designated by reference 20.

Figure 4:
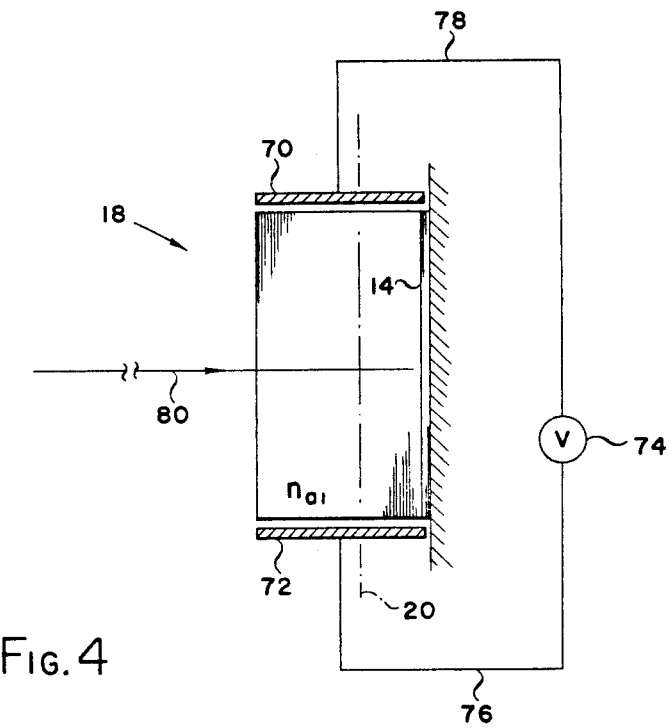
FIGURE 4 is a schematic view of part of the device shown in FIGURE 1 illustrating another embodiment of the invention wherein a pair of parallel conductive members, an electro-optic material, and a source for applying a signal to the conductive members is provided.

At this point it is of interest to note that each of the arrangements shown in FIGURES 1, 2 and 3 has as one of its primary objectives the provision of a mechanism which varies the apparent location of one or both of the mirrors of the system. With reference to FIGURE 4, there is shown another embodiment of the present invention wherein the apparent location 20 of mirror 14 is varied by changing the refractive index ($n$) of an electro-optic material. As shown in FIGURE 4, a pair of conductive elements 70 and 72 are disposed about (on opposite sides of) the electro-optic dielectric element 18 and connected to a signal source 74 through conductors 78 and 72, respectively.

Use of the foregoing arrangement as shown in FIGURE 4, permits the optical phase bias of the arrangement to be varied by the imposition of a direct current voltage across conductive plates 70 and 72. In addition, an optical signal passing through dielectric element 18 may be modulated by the imposition of a modulation signal across conductive plates 70 and 72, causing the output interference pattern amplitude to vary in accordance with the modulating signal. In this arrangement the device may be considered as an optical beam modulator.

Operation of the present invention will be discussed with reference to FIGURES 5 and 6, wherein the characteristic output response of the arrangements shown in FIGURES 1–4 is illustrated. More particularly, the optical output response of the present invention as a function of frequency is characterized as a cosine$^2$ curve, as defined by Equation 2.

Referring now to FIGURE 5, the characteristic output response of the arrangements shown in FIGURES 1–3 is a cosine$^2$ curve which has substantially linear regions $A^1$–$B^1$ and A–B, the slopes of which are substantially the same but of opposite sign. It should be noted that point A on the curve corresponds to a frequency ($f_1$) while point B corresponds to higher frequency ($f_2$). Thus, it can be seen that a small change in frequency ($\Delta f$), (which may be due to a Doppler shift) represents a significant variation or change in optical output intensity between points X and Y taken along the vertical axis of the plot.

As has been noted hereinabove the phase difference $\Delta \phi$, is proportional to a change in frequency ($\Delta f$) and to the optical path difference ($\Delta f$). As a consequence it is possible to establish a bias point such as point A as the operating point of a device in accordance with the present invention. Such biasing may be accomplished by a small adjustment of the optical length ($l$) between the beam splitter 16 and the apparent position of the mirror in FIGURE 1 or the apparent position of one or both of mirrors in FIGURES 2 and 3. Adjustment of the optical length ($l$) may be accomplished in one of several ways as noted hereinabove, namely, by physically moving the mirrors through the use of a mechanism such as that designated 21 in FIGURES 1 and 2, or by changing the refractive index of a dielectric element by means of the device shown in FIGURE 4.

Once the optical phase bias has been set at point A, at the lower end of the linear portion of the cosine$^2$ curve, the device will be capable of measuring Doppler shifts or frequency changes in the input beam ($\Delta f$) as a function of change along the linear portion of the curve between points A and B.

Referring to FIGURE 6, there is shown a plot of the cosine$^2$ curve shown in FIGURE 5 and a frequency modulated curve illustrated as a plot of time (along the vertical axis) versus frequency (along the horizontal axis). In the figure the frequency modulated plot has been superimposed upon the cosine$^2$ curve along the linear region between points A and B. The resultant amplitude modulated plot varies in amplitude between points E and X along the optical output intensity axis. Thus, a linear relationship is illustrated in the conversion of the frequency modulated (FM) signal to an amplitude modulated (AM) signal through the use of linear portion of the cosine$^2$ curve which is phase biased for operation at point A along the curve.

In closing, it should be noted that the present invention provides an optical differential interferometer discriminator for FM to AM conversion which has been found to be efficient and accurate. The simplicity with which the FM to AM conversion is accomplished in accordance with the present invention makes the device extremely practical for the solution of problems heretofore unresolved and those resolved only through the use of complex devices having intolerable inaccuracies and restrictions in their application owing to thermal effects, noise and other limitations known to those skilled in the art.

More particularly, as to the utility of the present invention, use has been made of the present device to demodulate reflected laser light which has been frequency modulated resulting from measuring shock imposed upon solid materials, and for converting Doppler shifted light into a related (AM) optical signal. As is well known by those versed in the art, Doppler shifts may also occur in communication systems. The use of laser devices employing the differential interferometer discriminator to monitor explosive forming processes and to measure structural vibration where structural changes do not lend themselves to the use of strain gauges or conventional accelerometers is also apparent.

It is to be understood that the above described device arrangements and modes of operation are illustrative of applications and the principles of the invention. Numerous other arrangements and modes of operation may be devised by those skilled in the art without departing from the spirit and scope of the invention. Accordingly, it is to be understood that the present invention is limited only by the spirit and scope of the appended claims. The term "means" as used in the appended claims is intended to cover various equivalents for performing the specific function or functions and is not to be construed as limited to the specific embodiment or embodiments shown.

What is claimed as new is:

1. A device for demodulating a frequency modulated (FM) optical input beam the combination comprising:
    (a) A beam splitter for splitting said beam into at least two perpendicular paths of unequal physical and optical lengths, said at least two perpendicular paths having apparent geometrically equal path lengths,
    (b) a reflectance mirror disposed along each of said perpendicular paths for fixing the path lengths thereof and for reflecting said frequency modulation optical beam,
    (c) at least one element of an electro-optic dielectric material disposed along at least one of said perpendicular paths adjacent at least one said reflectance mirror for varying the physical and optical path length thereof, and
    (d) means for recombining reflected beams from along said at least two perpendicular paths for producing an output interference pattern between said interference beams which is transmitted along an output path and is characterized as an amplitude output modulated beam.

2. A device for amplitude modulating an optical input beam the combination comprising:
    (a) a beam splitter for splitting said beam into at least two perpendicular paths having unequal physical and optical path lengths, said at least two perpendicular paths having apparent geometrically equal path lengths,
    (b) a reflectance mirror disposed along each of said perpendicular paths for fixing the path lengths thereof and for reflecting the optical input beam back along said perpendicular paths,
    (c) at least one element of an electro-optic dielectric material is disposed along at least one of said perpendicular paths adjacent said reflectance mirror,
    (d) means disposed about said at least one element of electro-optic dielectric material for changing the refractive index thereof to vary the length of said at one path length having said element of an electro-optic dielectric material disposed therealong geometrically with respect to said other path lengths, and
    (e) means for recombining reflected beams from along said perpendicular paths and for transmission along an output path to thereby produce an amplitude modulated output beam.

3. The method of converting a frequency modulated (FM) input optical beam to an amplitude modulated beam interference output pattern the steps comprising:
    (a) transmitting an input frequency modulation optical beam through a beam splitter to thereby split the beam for transmission along two perpendicular paths,
    (b) transmitting said split frequency modulated signal along their respective paths each having unequal physical and optical path lengths, said path length being determined by a reflectance mirror disposed at the end of each of said paths,
    (c) transmitting at least one of said split frequency modulated beams through an electro-optic dielectric material disposed adjacent one of said reflectance mirrors and reflecting said transmitted beam back through said electro-optic dielectric material along said path, and
    (d) recombining the reflected beams from along each of said paths at said beam splitter and transmitting said recombined frequency modulated optical beams along a third perpendicular path to thereby produce an amplitude modulated beam interference output pattern.

4. An optical differential interferometer discriminator for converting frequency modulated signals to amplitude modulated signals and comprising:
    (a) beamsplitting means for receiving an input frequency modulated optical beam and for transmitting said optical beam along first and second divergent paths, said second path traversing a medium of determinable index of refraction;
    (b) first reflecting means disposed along said first path a first spatial distance from said beamsplitting means for fixing the optical length thereof and for reflecting said optical beam along said first path;
    (c) second reflecting means disposed along said second path a spatial distance from said beamsplitting means greater than said first spatial distance for fixing the optical length thereof and for reflecting said optical beam along said second path;
    (d) dielectric means transversing said second path and having a higher index of refraction than said medium whereby the geometric length of said second path appears substantially equal to the optical length of said first path; and
    (e) means for recombining reflected beams from along said first and second paths for producing an output interference pattern between said reflected beams which is transmitted along an output path and is characterized as an amplitude modulated output optical beam.

5. An optical differential interferometer discriminator as defined in claim 4 having means for varying the optical length of one of said divergent paths with respect to the optical length of the other of said divergent paths.

6. An optical differential interferometer discriminator as defined in claim 4 having means for varying the refractive index of said dielectric means in order to vary the apparent geometric length of said second path.

7. An optical differential interferometer discriminator as defined in claim 6 wherein said means for varying the refractive index of said dielectric means comprises means for applying an electric field to said dielectric means.

8. An optical differential interferometer discriminator as defined in claim 4 having second dielectric means transversing said first path.

9. An optical differential interferometer discriminator as defined in claim 4 wherein said dielectric means abuts said second reflecting means.

10. An optical differential interferometer discriminator as defined in claim 4 having a plurality of electro-optic dielectric elements transversing said first and second paths.

11. An optical differential interferometer discriminator as defined in claim 4 wherein said second path is $\Delta L$ greater in optical length than said first optical path and wherein $$\Delta L = 2la_1\left(na_1 - \frac{1}{na_1}\right)$$

where
- $a_1 =$ the optical distance said second path traverses said dielectric means, and
- $na_1 =$ the index of refraction of said dielectric means.

References Cited

UNITED STATES PATENTS

| | | | |
|---|---|---|---|
| 3,175,088 | 3/1965 | Herriott | 356—106 |
| 3,243,722 | 3/1966 | Billings | 331—94.5 |
| 3,286,582 | 11/1966 | Mertz | 356—106 |
| 3,302,027 | 1/1967 | Fried et al. | 250—199 |

JOHN KOMINSKI, Primary Examiner

U.S. Cl. X.R.

250—199; 329—1, 110; 331—94.5; 356—106